United States Patent
Barhorst et al.

(10) Patent No.: US 8,485,358 B2
(45) Date of Patent: Jul. 16, 2013

(54) SYSTEM FOR SECURING WIRE WITH A FLOATING TIE-DOWN ASSEMBLY

(75) Inventors: Steve Barhorst, Sidney, OH (US); Eric Heyne, Vandalia, OH (US); Brenda Comer, Casstown, OH (US); Phil Hissong, Piqua, OH (US)

(73) Assignee: Illinois Tool Works Inc., Glenview, IL (US)

( * ) Notice: Subject to any disclaimer, the term of this patent is extended or adjusted under 35 U.S.C. 154(b) by 24 days.

(21) Appl. No.: 12/946,756

(22) Filed: Nov. 15, 2010

(65) Prior Publication Data

US 2011/0203948 A1   Aug. 25, 2011

Related U.S. Application Data

(60) Provisional application No. 61/307,335, filed on Feb. 23, 2010.

(51) Int. Cl.
 *B65D 85/04* (2006.01)
 *B65D 85/00* (2006.01)

(52) U.S. Cl.
 USPC ............................ 206/408; 206/409; 206/397

(58) Field of Classification Search
 USPC ....... 206/409, 408, 389, 397, 223; 242/588.3, 242/129
 See application file for complete search history.

(56) References Cited

U.S. PATENT DOCUMENTS

| | | | |
|---|---|---|---|
| 2,625,317 A * | 1/1953 | Macchesney | 206/416 |
| 4,796,939 A * | 1/1989 | Symonds et al. | 294/67.1 |
| 4,869,367 A * | 9/1989 | Kawasaki et al. | 206/409 |
| 5,105,943 A * | 4/1992 | Lesko et al. | 206/397 |
| 5,819,934 A | 10/1998 | Cooper | |
| 6,715,608 B1 * | 4/2004 | Moore | 206/397 |
| 6,723,954 B2 | 4/2004 | Nikodym et al. | |
| 6,723,957 B2 | 4/2004 | Holverson et al. | |
| 6,857,521 B2 * | 2/2005 | Cantu-Gonzalez | 206/397 |
| 7,084,372 B2 | 8/2006 | Holverson et al. | |
| 7,087,860 B2 | 8/2006 | Nikodym et al. | |
| 7,152,735 B2 | 12/2006 | Dragoo et al. | |
| 7,172,070 B2 | 2/2007 | Coon et al. | |
| 7,222,734 B2 | 5/2007 | Barton | |
| 7,331,457 B2 | 2/2008 | Cipriani | |
| 7,335,852 B2 | 2/2008 | Holverson et al. | |
| 7,377,388 B2 * | 5/2008 | Hsu et al. | 206/408 |
| 2006/0243717 A1 | 11/2006 | Holverson et al. | |
| 2008/0149513 A1 | 6/2008 | Rolfes et al. | |
| 2008/0149600 A1 | 6/2008 | Holverson et al. | |

FOREIGN PATENT DOCUMENTS

WO   WO2010131107   11/2010

* cited by examiner

*Primary Examiner* — Steven A. Reynolds
(74) *Attorney, Agent, or Firm* — Fletcher Yoder P.C.

(57) ABSTRACT

The present embodiments are directed towards securing wire within a container. Advantageously, the present embodiments provide a system in which wire may be secured without modification of the container. Specifically, the present embodiments provide a floating tie down assembly configured to hold together a bundle of welding wire in a welding wire container. The floating tie down assembly is configured to float within the welding wire container, and the floating tie down assembly includes a lower removable insert, an upper removable insert, and a resilient material extending between the lower insert and the upper insert.

15 Claims, 7 Drawing Sheets

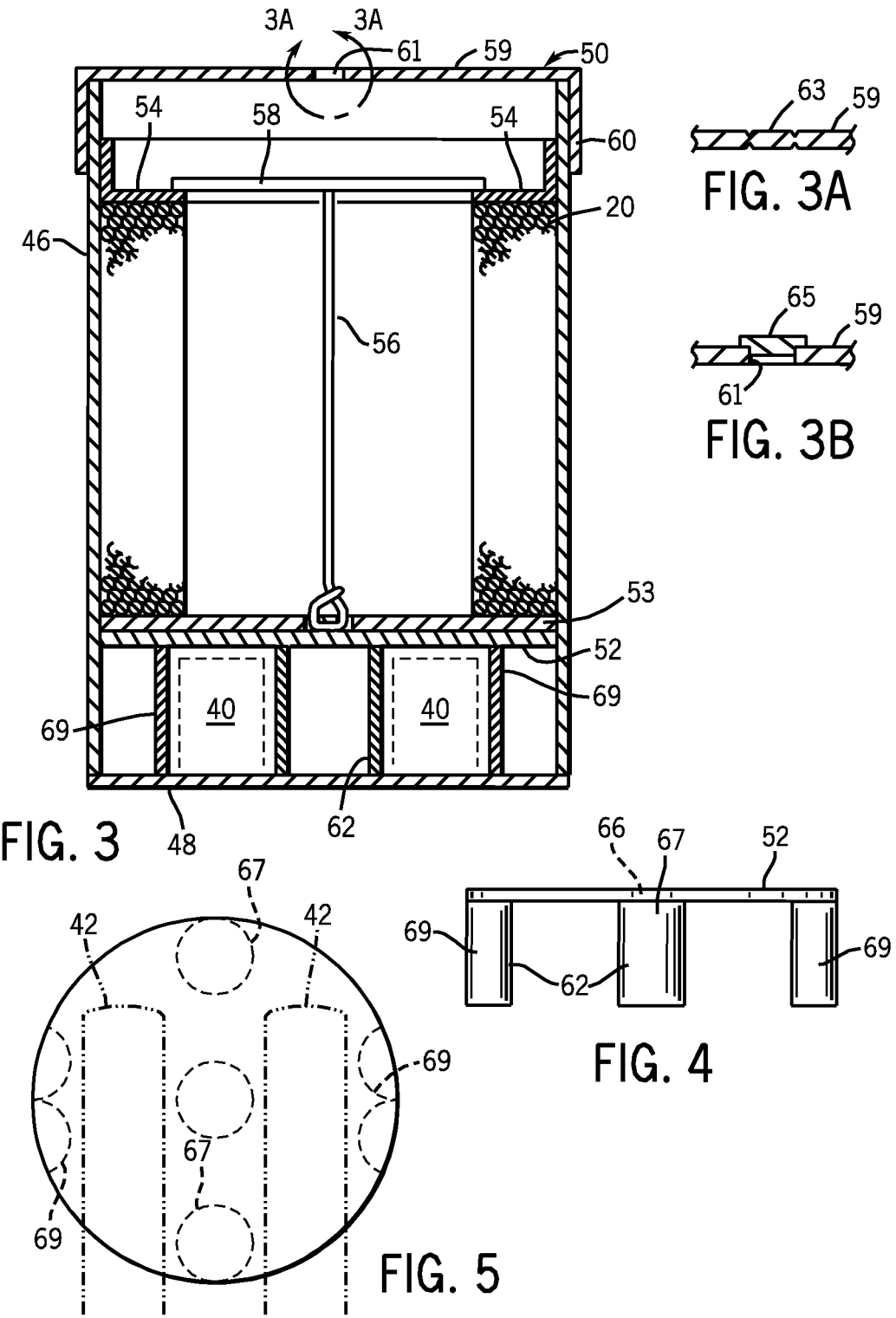

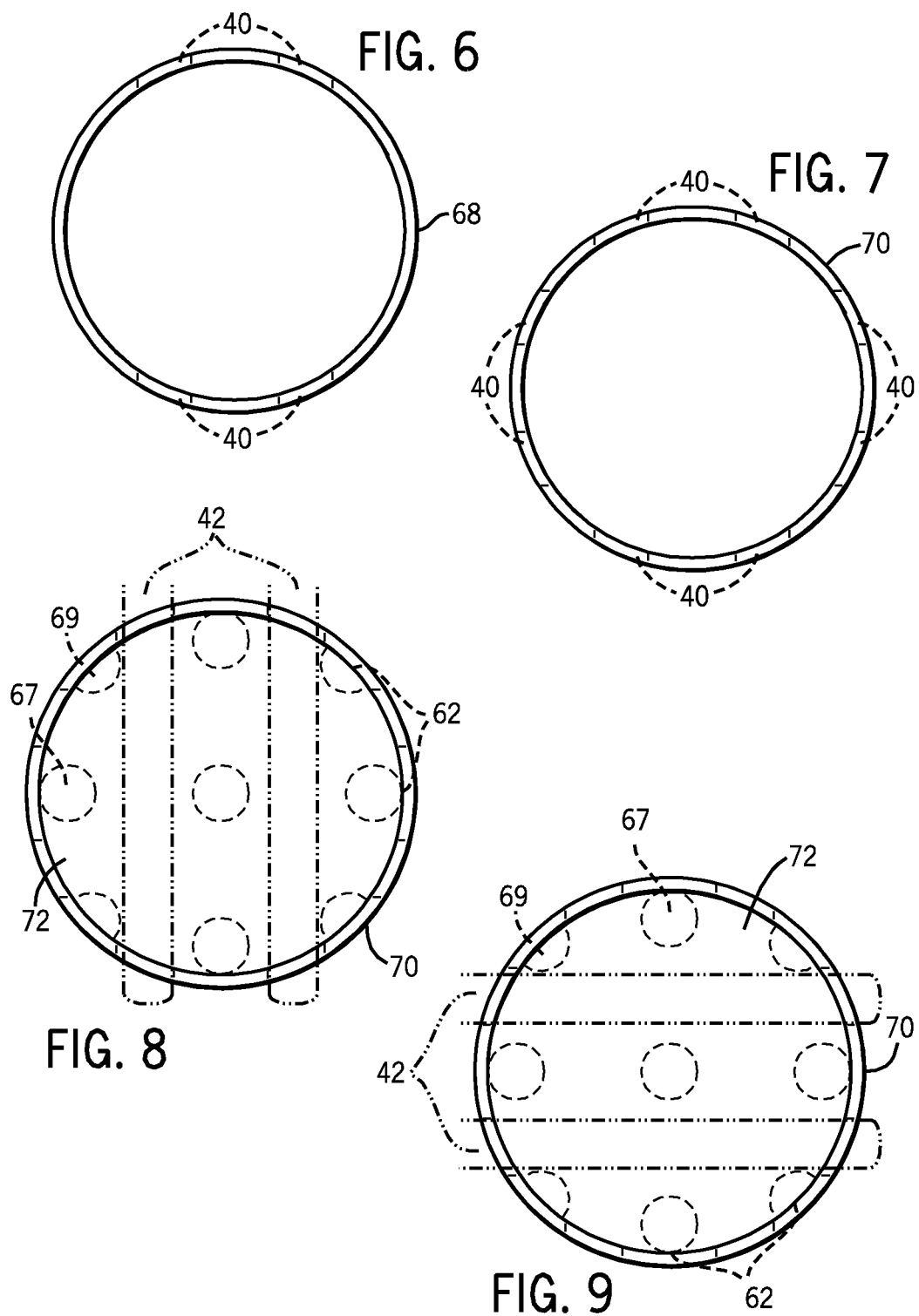

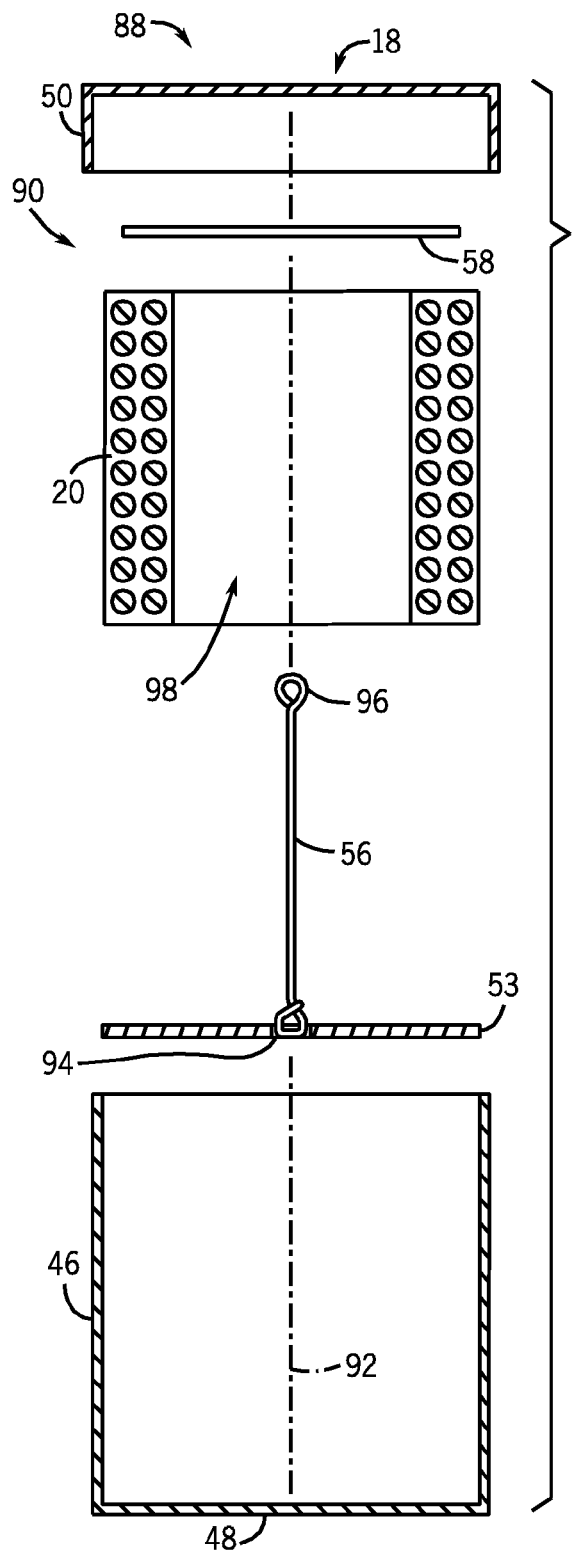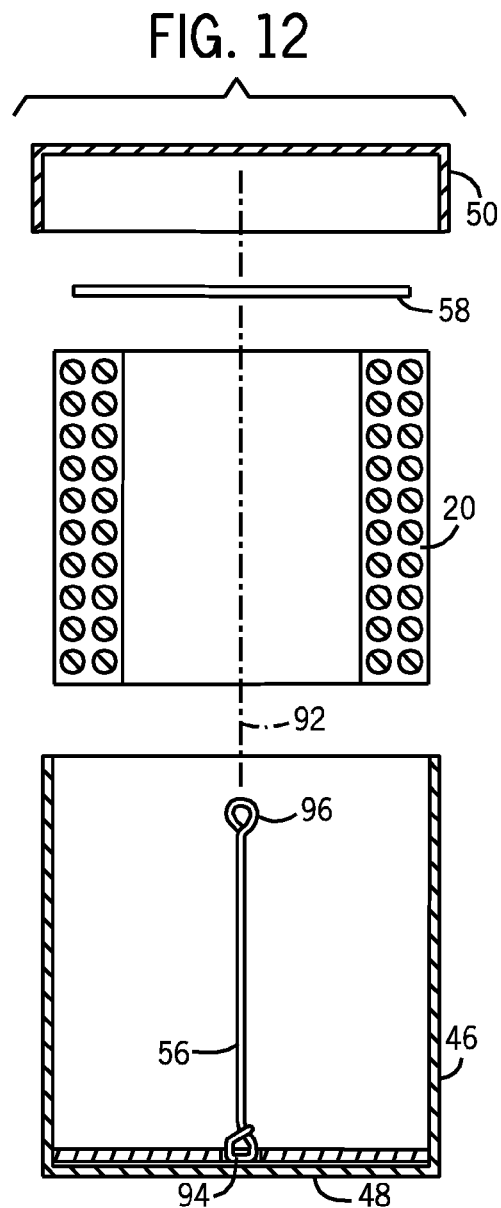

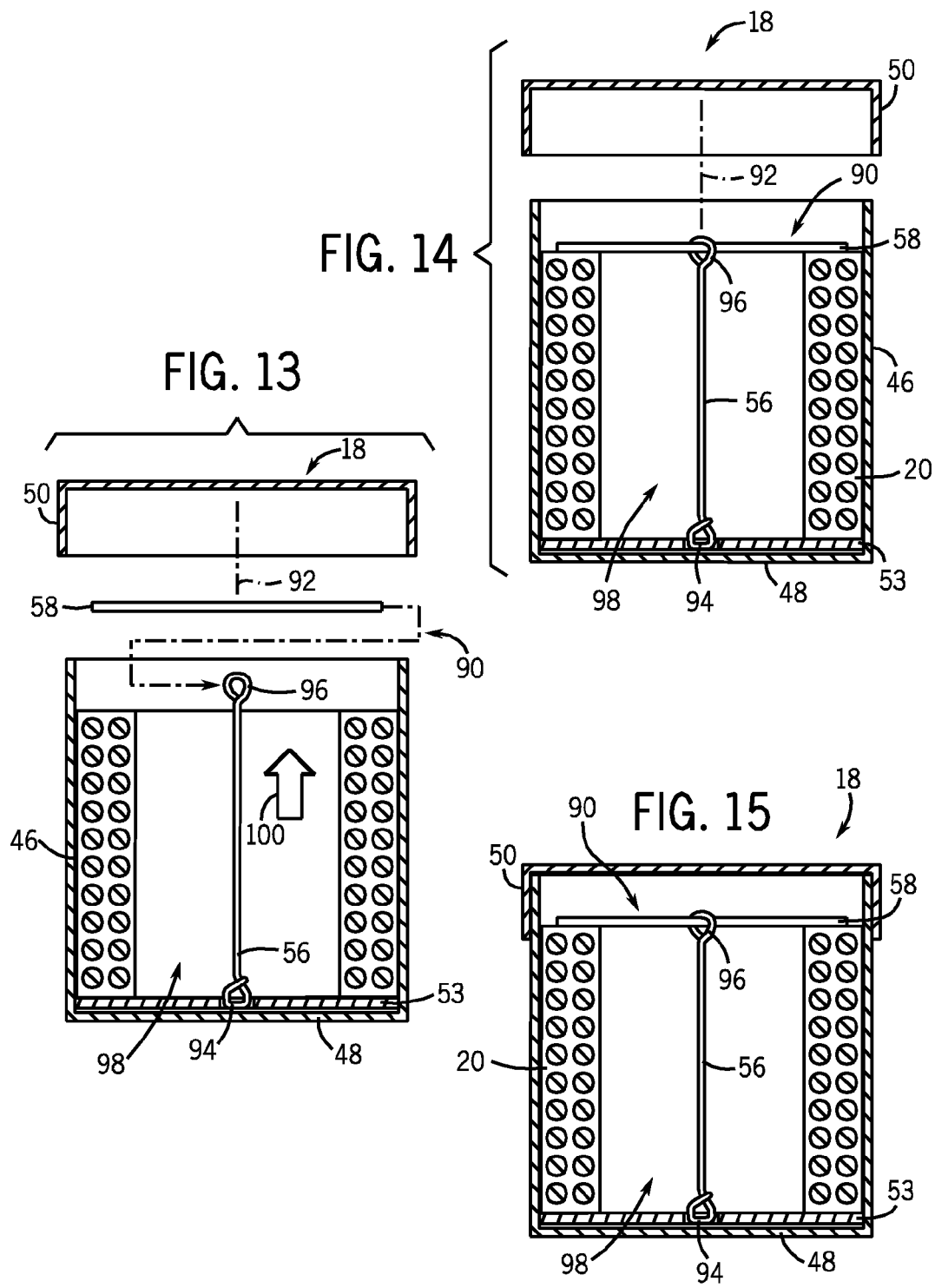

SYSTEM FOR SECURING WIRE WITH A FLOATING TIE-DOWN ASSEMBLY

CROSS REFERENCE TO RELATED APPLICATION

This application is a non provisional of U.S. Provisional Patent Application No. 61/307,335, entitled "METHOD FOR SECURING WIRE WITH A FLOATING TIE-DOWN ATTACHMENT APPARATUS," filed Feb. 23, 2010, which is herein incorporated by reference in its entirety.

BACKGROUND

The present disclosure relates generally to the securing of wire in bulk packaging, and more particularly to a system and method for securing wire in drums using a tie-down apparatus.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wire, such as wire that is used for welding, is often transported from a wire manufacturer to an end user or consumer of the wire product in drums, boxes, or coils. As an example, drums may be used to store wire for use in an arc welding system. In some arc welding systems, such as MIG (Metal Inert Gas) welding systems, metal wire is used as an electrode to produce an arc. The welding wire also acts as filler material and is consumed during the welding process.

During transport from the wire manufacturer to the wire consumer, the wire may shift, bounce, or otherwise be disturbed, which can cause the wire to loop under itself or entangle. Such entangling may be problematic, for example in situations where the wire is utilized directly from the container in which it has been transported. Accordingly, there is a need to secure wire in transport containers to prevent undesirable movement of the wire during transport.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure provides a system having a welding wire container assembly. The assembly includes, among other features, a container configured to support a bundle of welding wire and a floating tie down assembly configured to hold together the bundle of welding wire. The floating tie down assembly is configured to float within the container.

In another embodiment, a system is provided including a floating tie down assembly configured to hold together a bundle of welding wire in a welding wire container. The floating tie down assembly is configured to float within the welding wire container, and the floating tie down assembly has a lower removable insert, an upper removable insert, and a resilient material extending between the lower insert and the upper insert.

In a further embodiment, a system is provided including a welding wire container assembly. The welding wire container assembly includes a container having an opening and a storage receptacle, a bundle of welding wire disposed in the storage receptacle, a cover disposed over the opening, and a floating tie down assembly disposed in the storage receptacle. The floating tie down assembly has a lower removable insert disposed below the bundle, an upper removable insert disposed above the bundle, and a resilient material extending between the lower removable insert and the upper removable insert.

DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional view of an embodiment of a container adapted for shipping, in accordance with an aspect of the present disclosure;

FIG. 3A is a detailed view of an embodiment of the cover of the container of FIG. 3, as taken generally along line A-A, in accordance with an aspect of the present disclosure;

FIG. 3B is a detailed view of an embodiment of the cover of the container of FIG. 3, as taken generally along line A-A in accordance with an aspect of the present disclosure;

FIG. 4 is an elevational view of an embodiment of a false bottom for a container, in accordance with an aspect of the present disclosure;

FIG. 5 is a top view of the false bottom of FIG. 4, in accordance with an aspect of the present disclosure;

FIG. 6 is a top view of an embodiment of a container, in accordance with an aspect of the present disclosure;

FIG. 7 is a top view of an embodiment of a container, in accordance with an aspect of the present disclosure;

FIG. 8 is a top view of the fiber drum of FIG. 7 and an embodiment of a container, illustrating the insertion of forks into the fiber drum from a first direction, in accordance with an aspect of the present disclosure;

FIG. 9 is a top view of the fiber drum of FIG. 7 and an embodiment of a container, illustrating the insertion of forks into the fiber drum from a second direction, in accordance with an aspect of the present disclosure;

FIG. 11 is an exploded view of a container assembly including the container of FIGS. 1-9 and an unassembled floating tie down assembly, in accordance with an aspect of the present disclosure;

FIG. 12 is an exploded view of a container assembly including the container of FIGS. 1-9 and a partially-assembled floating tie down assembly, a portion of which is disposed within the container, in accordance with an aspect of the present disclosure;

FIG. 13 is an exploded view of a container assembly including the container of FIGS. 1-9 and the floating tie down assembly ready for wire compaction, in accordance with an aspect of the present disclosure;

FIG. 14 is an exploded view of a container assembly including the container of FIGS. 1-9 and the floating tie down assembly placing compressive forces on the wire within the container, in accordance with an aspect of the present disclosure;

FIG. 15 is a schematic view of the container assembly in assembled form and the floating tie down assembly placing compressive forces on the wire within the container, in accordance with an aspect of the present disclosure;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards securing wire within a container using a floating tie down assembly that is separate from the container. According to the present disclosure, the floating tie down assembly may be considered to float within the container as there is no direct connection between the tie down assembly and the container. That is, the term "floating" as used herein is intended to describe the assembly as removable and moveable within a storage receptacle. In this way, the present embodiments allow wire to be secured without the cost of modifying the wire container. In some embodiments, the floating tie down may include a first insert that is placed within the container. Specifically, the container may have an opening (e.g., at the top of the container) and a storage receptacle (i.e., a cylindrical portion enclosing the items that are placed within the storage container). The first insert may be placed at a lower portion of the container so as to rest underneath the wire which is to be transported. To the first insert is secured a resilient material that is able to be stretched longitudinally through an annular opening formed by a bundle of the wire. The bundle of wire is then placed atop the insert, and the resilient material is stretched through the annular opening. The resilient material may include an opening or other suitable feature to allow it to be secured to an upper insert at an area generally above the bundle of wire. Once the upper insert has been secured to the resilient material, the resilient material is released, which allows the inserts to apply compressive force, as determined by the return force of the resilient material. This compressive force allows the floating tie down assembly to secure the wire in a manner entirely separate from the container. To allow consumption of the wire, the upper insert is pulled away from the bundle of wire and detached from the resilient material to expose a top portion of the bundle of wire. Various embodiments of the floating tie down assembly and possible implementations are described in detail hereinbelow.

Figure 1:
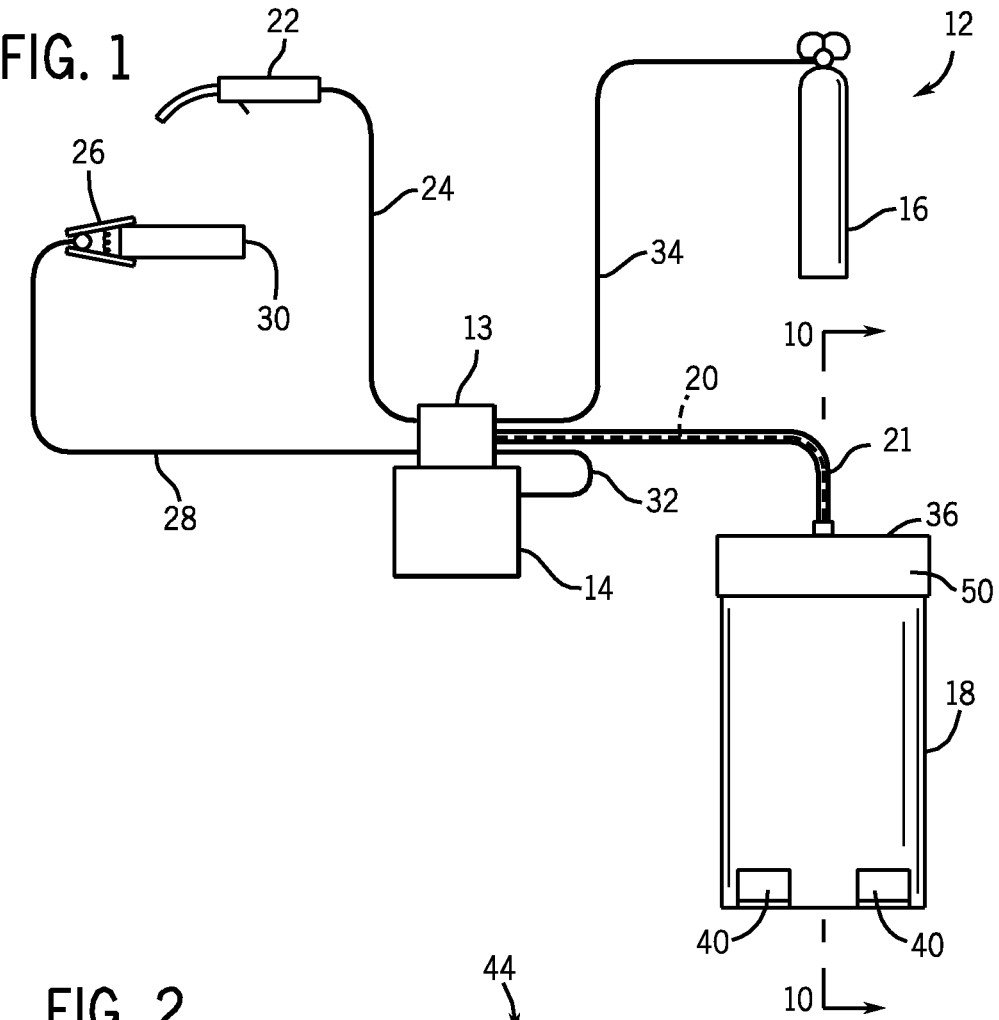
FIG. 1 is a diagrammatical view of an embodiment of a wire welding system, in accordance with an aspect of the present disclosure.

The bundle of wire that is to be transported may have a number of uses where it is consumed directly within or directly from the container in which it is transported. Such an implementation is illustrated in FIG. 1, which is a diagrammatical view of a wire-welding system 12, such as a MIG welding system. In the illustrated embodiment, wire-welding system 12 includes a wire feeder 13, a power source 14, a gas cylinder 16 and a container 18 (a storage receptacle) with welding wire 20 disposed therein. The recyclable container 18 may be constructed from a number of materials, such as fibrous materials (e.g., cellulosic paper, paperboard, or cardboard), plastics (e.g., polyethylene, polypropylene, polystyrene), and/or metal (e.g., aluminum, steel, among others).

During use of the wire-welding system 12, the power source 14 provides electricity to the wire feeder 13; the gas cylinder 16 provides inert gas to the wire feeder 13; and the container 18 provides welding wire 20 to the wire feeder 13 via a conduit system 21. In the illustrated embodiment, the wire feeder 13 provides electricity, welding wire 20, and inert gas to a welding torch 22. The wire, gas, and electricity are coupled to the torch 22 by a welding cable 24. In addition, a work clamp 26 is coupled to the wire feeder 13 by a ground cable 28. The work clamp 26 is secured to a workpiece 30 to electrically couple the workpiece 30 to the wire feeder 13. The torch 22 controls the operation of the system 12. When the torch 22 is activated, welding wire 20 is fed through the torch 22 by the wire feeder 13. When the welding wire 20 contacts the workpiece 30, an electrical circuit between the workpiece 30 and the wire feeder 13 is completed and an electric arc is produced. The electric arc melts the workpiece 30 and welding wire 20 at the point of contact. The inert gas shields the molten area from contaminants. A power cable 32 conducts electricity from the power source 14 to the wire feeder 13. A hose 34 channels gas from the gas cylinder 16 to the wire feeder 13.

Figure 2:
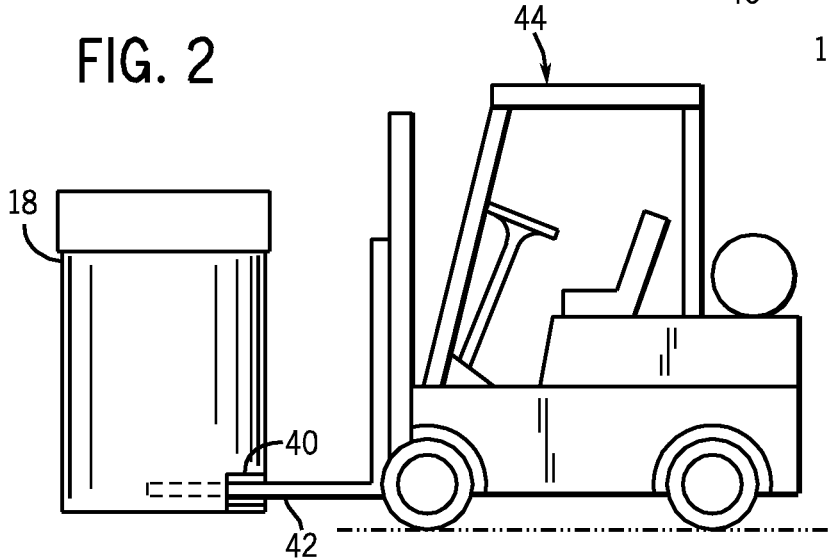
FIG. 2 is an elevational view illustrating the lifting of a container by a forklift, in accordance with an aspect of the present disclosure.

In the illustrated embodiment, the container 18 is a hollow, generally cylindrical drum. However, the container 18 may have a shape other than a cylindrical shape. For example, the container 18 may be square, hexagonal, octagonal, etc. A spool of welding wire is disposed within the hollow interior of the container 18. The container 18 has at least one, and as illustrated, a plurality of holes, or recesses 40 located on a bottom portion of the container 18. As illustrated in FIG. 2, the container 18 is adapted to enable the forks 42 of a forklift 44, or other member of a lifting device, to enter one or more of the plurality of holes, or recesses, 40 and be positioned below the welding wire 20 to lift the container 18. In the illustrated embodiment, two holes 40 are used, one for each fork 42 of the forklift 44. However, the container 18 also may be adapted with a single hole, or recess, that enables two forks 42, or a single lifting member to enter the container 18. In addition, exit holes may be provided to enable the forks 42 to extend through the container 18. Furthermore, a lifting device other than a forklift 44 may be used to lift the container 18 via one or more of the holes 40, or other (i.e. open) recesses. For example, lifting straps could be passed through the openings to enable an overhead crane to lift the container 18. Other lifting devices may also be used.

Referring generally to FIG. 3, an embodiment of a container 18 adapted for shipping is illustrated. In the illustrated embodiment, the container 18 has a cylindrical portion 46, a bottom 48, a lid 50, and a false bottom 52. The false bottom 52 is placed within the cylindrical portion 46. For example, the false bottom 52 may be fixed or removable. A lower insert 53 is then placed within the cylindrical portion 46 atop the false bottom 52. In the illustrated embodiments the lower insert 53 is removable. The welding wire 20 is then placed atop the lower insert 53. A removable ring 54 is floated atop the spool of wire 20 to guide the wire 20 as it is unwound from the spool. In some embodiments, the removable ring 54 is made of metal, though it should be noted that any material may be used. A resilient material 56, such as an elastomeric band, is secured to the lower insert 53 and extends through the annular opening formed by the welding wire 20 towards a top end of the container 18. An upper insert, such as a rod 58, is secured to the resilient material 56 and is used to drive the rod 58 downward to secure the welding wire 20 within the cylindrical housing 46 during transport. In some embodiments, the rod 58 may be a metal rod, a cardboard rod, a plastic rod, or a rod constructed from any material of suitable strength so as to prevent de-bundling of the wire 20. The rod 58 may be removed from the container 18 when the drum is placed in service. The resilient material 56 also may be removed at this time. The ring 54 is removed when the wire 20 has been consumed. The manner in which the welding wire 20 is secured is discussed in further detail with respect to FIGS. 11-19.

In the illustrated embodiment, the cylindrical portion 46, bottom 48, cover 50, and false bottom 52 are include a similar or different material, such as cellulosic paper, paperboard, cardboard, plastic, or metal. In the illustrated embodiment, the cover 50 has a top portion 59 and a skirt portion 60. The top portion has an opening 61 therethrough to enable welding wire 20 to pass through the cover 50. The opening 61 may be a hole, as shown in FIG. 3, or a notch located on the periphery of the cover 50. As illustrated in FIG. 3A, the cover 50 may be adapted with a punch-out 63 to enable a customer to form the opening 61 by punching the punch-out 63 through the top portion 59 of the cover 50. The punch-out 63 may be formed in a number of ways. For example, a press may be used to press a circular pattern outlining the punch-out 63 into the top portion of the cover 50. The circular pattern, which generally defines the area of the punch-out 63, is weaker than the cover 50, causing the cover 50 to tear at the circular pattern when a sufficient force is applied to the center of the punch-out 63. Alternatively, as illustrated in FIG. 3B, a plug 65 or insert may be placed over the hole 61 during shipment to prevent debris or other objects from entering the container.

In the illustrated embodiment, the cover 50 is held in position on the housing 46 by friction between the skirt portion 60 of the cover and the cylindrical portion of the container 18. However, a strap or other device may be used to further secure the cover 50 to the housing 46. In addition, in this embodiment, the cylindrical housing 46, bottom 48, cover 50, and false bottom 52 are adapted to be free of metal so that they may be more readily recycled once the welding wire has been consumed. The metal ring 54 and metal rod 58 may be recycled as metal once they are removed from the container 18.

Referring generally to FIGS. 4 and 5, a plurality of supports 62 are secured to the false bottom 52. The plurality of supports 62 and false bottom 52 are adapted to support the welding wire 20 above the bottom to provide clearance for the forks 42 of the forklift 44 to enter the container 18 below the wire 20. In the illustrated embodiment, the supports 62 may be adapted from similar materials discussed above. However, the supports 62 may include another suitable material. In this embodiment, there are circular supports 67 and semi-circular supports 69. The semi-circular supports 69 may be adapted from the circular supports 67, for example, by cutting them in half lengthwise. Preferably, the supports 62 are secured, such as by glue, to the bottom 48 and the false bottom 52. The false bottom 52 also may be secured to the cylindrical portion 46 of the container 18. Furthermore, rather than using a false bottom 52 and the plurality of holes 40, the container 18 may be adapted with the supports 62 secured to the bottom 48 of the container 18 from below, rather than from above, to create a space for the forks 42, or another lifting member, to be positioned below the bottom 48 of the container 18.

Referring generally to FIG. 6, an embodiment of a drum 68 is illustrated. In the embodiment illustrated, a second plurality of holes 40 are provided opposite the first plurality of holes 40 to enable the forks to extend through the container 18 and to enable the forks to enter the fiber drum from a second orientation.

Referring generally to FIG. 7, another embodiment of a drum 70 is illustrated. In the illustrated embodiment, there are four pairs of holes disposed in drum 70, one pair in each quadrant. The plurality of holes 40 enable the forks 42 to enter the drum 70 from four directions.

Referring generally to FIGS. 8 and 9, another embodiment of a false bottom 72 disposed within the drum 70 is featured. The false bottom 72 is adapted to be aligned with the plurality of holes 40 to provide clearance for the forks 42 to enter the fiber drum 70 from each of four directions around the fiber drum 70.

Figure 10:
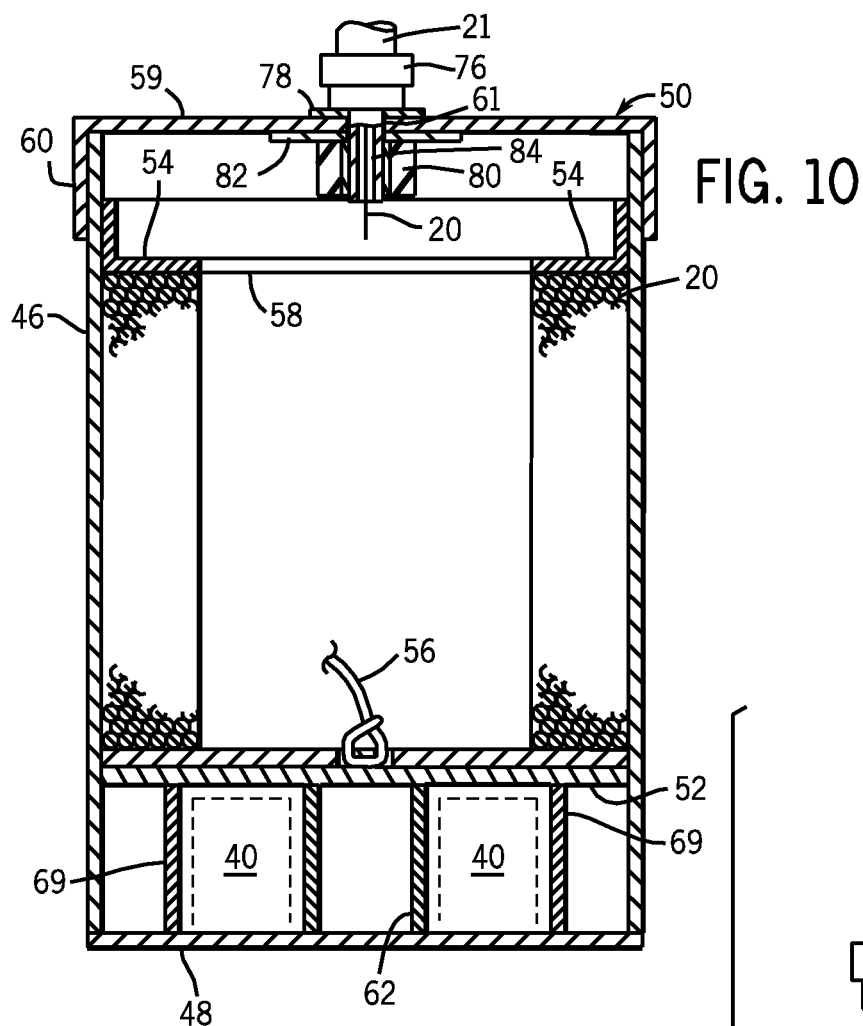
FIG. 10 is a cross-sectional view of the container of FIG. 1, taken generally along line 10-10 of FIG. 1, in accordance with an aspect of the present disclosure.

Referring generally to FIG. 10, a cross-sectional view of the fiber drum of FIG. 1 is illustrated. A conduit adapter assembly 74 is secured to cover 50 to couple the cover 50 and the conduit system 21. The conduit adapter assembly 74 is inserted through hole 61 in the cover 50. The conduit adapter assembly 74 is adapted to guide wire 20 from the container 18 into the conduit system 21.

Figure 10A:
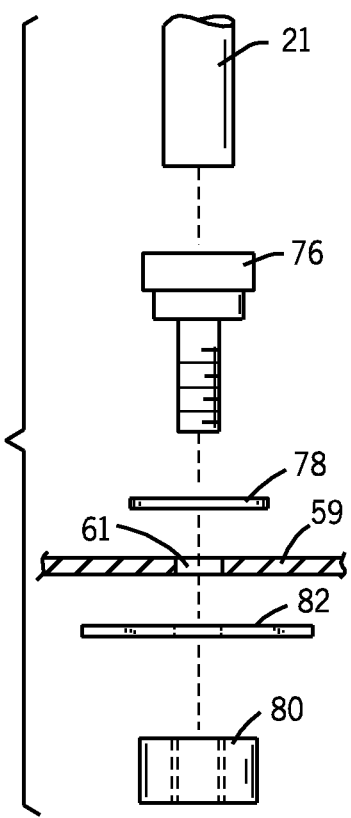
FIG. 10A is an exploded view of the container and adapter assembly, in accordance with an aspect of the present disclosure.

As illustrated in FIG. 10A, the conduit adapter assembly 74 comprises a quick-disconnect 76, a washer 78, a wire guide 80, and a plate 82. The quick-disconnect 76 and wire guide 80 are adapted to secure to each other through the hole 61 in the top portion 59 of the cover 50 and through holes in the washer 78 and plate 82, respectively. The quick-disconnect 76 and wire guide 80 form a path 84 for welding wire 20 to pass through the hole 61 in the container 18. The conduit adapter assembly 74 thereby guides the wire into the conduit system 21 and protects the cover 50 of the container 18 from damage due to abrasion from the welding wire 20. In addition, the quick-disconnect 76 is adapted to be quickly connected to or disconnected from the conduit system 21. Furthermore, the washer 78 and plate 82 distribute stress caused by the conduit adapter assembly 74 over a larger area of the top portion 59 of the cover 50.

Figure 16:
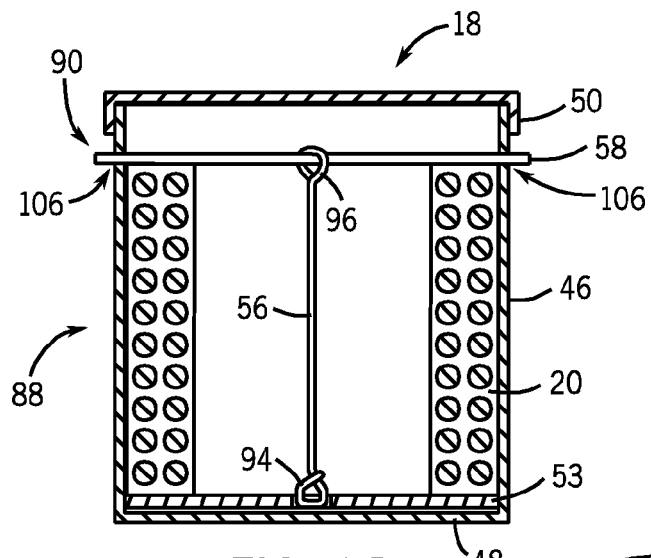
FIG. 16 is a schematic view of the container assembly in assembled form and the floating tie down assembly placing compressive forces on the wire within the container, the rod of the floating tie down assembly being secured through lateral openings within the container, in accordance with an aspect of the present disclosure.
Figure 17:
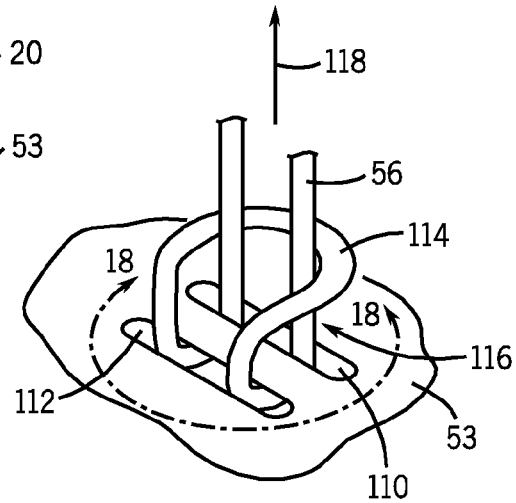
FIG. 17 is a schematic view of the manner in which the resilient material is secured to the lower insert of the floating tie down assembly, in accordance with an aspect of the present disclosure.
Figure 18:
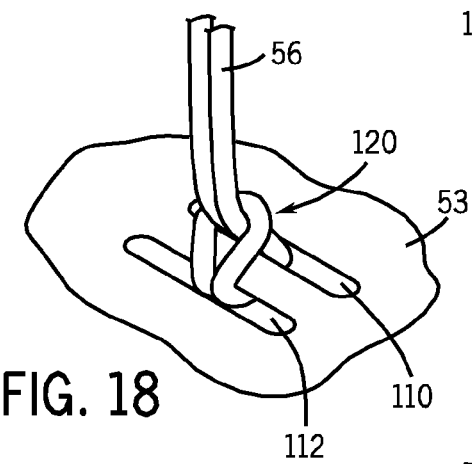
FIG. 18 is a schematic view of the resilient material after being secured to the lower insert of the floating tie down assembly, in accordance with an aspect of the present disclosure.
Figure 19:
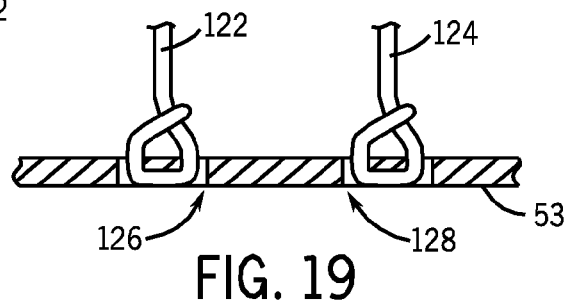
FIG. 19 is a schematic view of an embodiment of the floating tie down assembly having more than one resilient material, in accordance with an aspect of the present disclosure.

As noted above, the manner in which the wire 20 is secured within the container 18 may be further appreciated with respect to FIGS. 11-19. Specifically, FIGS. 11-16 indicate the respective positions of various components of the floating tie down assembly mentioned above. Further, FIGS. 17 and 18 illustrate the manner in which the resilient material 56 is secured to the lower insert 53. FIG. 19 illustrates an embodiment wherein the floating tie down assembly includes more than one resilient material secured to the lower insert 53.

FIG. 11 illustrates an exploded view of the container 18 described above, and, more specifically, a container assembly 88 having a floating tie down mechanism 90 including the lower insert 53, the resilient material 56, and the rod 58, which may be considered as an upper insert. The container 18 is illustrated as including the bottom portion 48 and a cylindrical portion 46 extending outward from the bottom portion 48 along a longitudinal axis 92. The embodiment set forth in FIG. 11 also illustrates the order in which the components of the floating tie down assembly 90, the welding wire 20, and the top 50 of the container 18 are disposed on/within the container 18 for shipping and/or storage.

To utilize the floating tie down assembly 90, the lower insert 53 is placed in the cylindrical portion 46 of the container 18. As illustrated, the resilient material 56 may be pre-secured to the lower insert 53 via one or more openings 94 that are cut into the lower insert 53. The manner in which the resilient material 56 is secured to the lower insert 53 is discussed in further detail below with respect to FIGS. 17 and 18. However, it should be noted that the present floating tie down assembly 90 allows the welding wire 20 to be secured without requiring a specially-designed or adapted container. For example, the floating tie down assembly 90 does not require that the container 18 have a cut-out at the bottom portion 48. Such a configuration without the need for a cut-out advantageously allows the welding wire 20 to be separated from the elements. In other words, the bottom portion 48 may be completely closed to block entry of water, condensation, debris, and other contaminants.

The resilient material 56 may be an elastomeric band, such as a rubber band made from or containing a suitable elastomer material, for example polybutadiene and derivatives thereof, rubbers, and so forth. It should be noted that the compressive force applied by the floating tie down assembly 90 may be directly dependent on the dimensions and material of the resilient material 56. In some embodiments, the resilient material 56 also includes a loop 96 through which the rod 58 may be inserted.

The welding wire 20 (or wire used for any purpose) is then disposed atop the lower insert 53, which may be a disc, and approaches along the longitudinal axis 92 to allow the resilient material 56 to pass through an annular opening 98 of the wire 20. The rod 58 is then set atop the wire 20 to apply compressive force for transport and/or storage, as discussed below. Of course, the lid 50 may cover the container 18 after all components have been secured so as to prevent the wire 20 from being exposed to the elements.

FIG. 12 illustrates the container 18 having the lower insert 53 and the resilient material 56 placed within the cylindrical portion 46. According to present embodiments, the lower insert 53 may be a disc having substantially the same shape as the bottom portion 48 of the container 18. Accordingly, the lower insert 53 may be in direct abutment with the inner surface of the bottom portion 48. While the present embodiment illustrates the lower insert 53 as having a curved or annular shape, it should be noted that the lower insert 53 can be any member that is capable of applying an inward force to the welding wire 20 as contemplated herein. For example, the lower insert 53 may have a rectangular, square, rhombic, triangular or similar shape, or may simply be a rod.

In accordance with the illustrated utilization of the floating tie down assembly 90, the lower insert 53 has been placed within the container 18 to abut the bottom portion 48, and the welding wire 20, rod 58, and lid 50 are not inside or in contact with the container 18. Another step of utilizing the floating tie down assembly 90 is illustrated in FIG. 13, wherein the welding wire 20 is placed within the container 18 atop the lower insert 53. A force 100 is placed on the resilient material 56 to stretch it, for example from a first length to a second length, in the longitudinal direction 92 past the welding wire 20. The rod 58 is then inserted through the opening 96 of the resilient material 58. The force 100 is then removed, which allows the restorative force of the resilient material 58 to apply compressive force to the welding wire 20 via the rod 58 and the lower insert 53, as illustrated in FIG. 14. In the embodiment illustrated in FIG. 14, the resilient material 56 may be at a third length, which may be longer than the first length but shorter than the second length.

FIG. 14 also illustrates the lower insert 53 as disposed in direct abutment with the bottom portion 48 of the container 18. The welding wire 20 is disposed atop the lower insert 53, and the resilient material 56 extends longitudinally through the annular (or any other shape) opening 98 of the welding wire 20. Towards a top end of the container 18 and atop the welding wire 20 is disposed the rod 58, which, together with the lower insert 53, now applies compressive force to the welding wire 20 for transport, for example to prevent undesirable entanglement or looping. Accordingly, the lower insert 53 and the rod 58 are advantageously constructed from materials suitable for the application of such forces. As an example, as noted above, the lower insert 53 and/or the rod 58 may be constructed from cellulosic materials, metal, or natural and/or synthetic polymeric materials. After the compressive force is applied to the welding wire 20, the lid 50 may be placed atop the container 18 to protect the welding wire 20 from the outside environment, as illustrated in FIG. 15.

FIG. 16 illustrates another embodiment of the floating tie down assembly 90 wherein the rod 58 is not fully contained within the container 18. For example, the container 18, and, more specifically, the cylindrical portion 46 may have one or more lateral openings 106 that allow the rod 58 to be disposed therethrough. In an example use, the resilient material 56 may be stretched to the second length, and the rod 58 may be inserted through opening 96. The rod 58 may also be inserted through the one or more openings 106 of the container 18. The openings 106 may be disposed at such a position to where the compressive force applied by the rod 58 and the lower insert 53 is at least equal to, or greater than, the compressive force generated by the restorative force of the resilient material 56. Moreover, the openings 106 may be vertical slots to allow vertical adjustments of the rod 58.

FIGS. 17 and 18 illustrate an embodiment of the manner in which the resilient material 56 may be secured to the lower insert 53. Specifically, FIG. 17 depicts a first step, and FIG. 18 depicts a second step of securing the resilient material 56 to the lower insert 53. To arrive at the configuration illustrated in FIG. 17, the resilient material 56 is inserted through one of the pair of openings 94 (FIG. 16), e.g., a first slit 110. The resilient material 56 is then pulled back through a second slit 112. An end portion 114 of the resilient material 56 is then pulled over an opposite end of the resilient material 56 to form a loop 116.

Once the loop 116 has been formed, a force 118 is applied in a direction away from the lower insert 53. It should be noted that force 118 may be applied directly to the resilient material 56 by pulling on the opposite end of the resilient material 56. The configuration of the resilient material 56 and the lower insert 53 resulting from the application of force 118 is depicted in FIG. 18. Specifically, the resilient material 56 has been secured to the lower insert 53, as can be appreciated by loop 120, which is tightly bound as opposed to the loose configuration depicted in FIG. 17.

In addition to the embodiments described above wherein the container assembly 88 includes one resilient material 56, the present embodiments also provide a container assembly with more than one resilient material so as to provide increased compressive force. Such embodiments may be desirable in applications where the wire 20 may be difficult to compress, or as a failsafe. FIG. 19 illustrates one such embodiment including a first resilient material 122 and a second resilient material 124 disposed within a first pair of openings 126 and a second pair of openings 128, respectively. In the illustrated embodiment, the first and second resilient materials 122 and 124 may both attach to the rod 58 so as to provide a compressive force to the wire 20 that is greater than would otherwise be obtained if a single resilient material were used.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a welding wire container assembly, comprising:
a container configured to support a bundle of welding wire and comprising a wall having lateral openings;
a floating tie down assembly configured to hold together the bundle of welding wire as a compressed assembly that is free to float within the container, wherein the floating tie down assembly comprises a lower removable insert configured to be placed against a bottom portion of the bundle of welding wire, an upper removable insert configured to be placed against an upper portion of the bundle of welding wire, wherein the upper removable insert comprises a rod-shaped insert that extends through the lateral openings in the wall of the container, and a resilient material coupling the lower insert to the upper insert, and wherein the floating tie down assembly is configured such that only the resilient material extends through a central opening of the bundle in the compressed assembly.

2. The system of claim 1, wherein at least the lower removable insert is configured to float within the welding wire container.

3. The system of claim 2, wherein the lower removable insert is configured to mount between a bottom of the bundle and a base of the container, and the upper removable insert is configured to mount above a top of the bundle, and wherein the lower removable insert, the upper removable insert, and the resilient material are all configured to float within the welding wire container.

4. The system of claim 3, wherein the resilient material is configured to pull the lower and upper removable inserts toward one another to apply a compressive force on the bundle.

5. The system of claim 3, wherein the lower removable insert comprises a disc-shaped insert.

6. The system of claim 1, comprising the bundle of welding wire disposed in the container.

7. A system, comprising:
a floating tie down assembly configured to hold together a bundle of welding wire in a welding wire container, wherein the floating tie down assembly comprises a lower removable insert, wherein the lower removable insert comprises a disc-shaped insert, an upper removable insert, and a resilient material coupling the disc-shaped insert and the upper insert, and at least the lower removable insert is configured to float within the welding wire container, and wherein the floating tie down assembly is configured such that when the floating tie down assembly holds the bundle together, only the resilient material extends through a central opening of the bundle of welding wire.

8. The system of claim 7, wherein the resilient material is configured to pull the lower and upper removable inserts toward one another to apply a compressive force on the bundle.

9. The system of claim 7, wherein the upper removable insert comprises a rod-shaped insert, and the resilient material comprises a resilient band coupled to the disc-shaped insert and the rod-shaped insert.

10. The system of claim 7, wherein the lower removable insert comprises first and second openings, and the resilient material comprises a loop extending through the first and second openings.

11. The system of claim 10, wherein the first and second openings are disposed in a central portion of the lower removable insert.

12. The system of claim 7, comprising the bundle of welding wire disposed between the lower and upper removable inserts.

13. A system, comprising:
a welding wire container assembly, comprising:
a container comprising an opening and a storage receptacle;
a bundle of welding wire disposed in the storage receptacle;
a cover disposed over the opening; and
a floating tie down assembly disposed in the storage receptacle, wherein the floating tie down assembly consists essentially of a lower removable insert disposed below the bundle, wherein the lower removable insert consists essentially of a disc-shaped insert, an upper removable insert disposed above the bundle, and a resilient material coupling the lower removable insert and the upper removable insert, and wherein at least the lower removable insert is configured to float within the welding wire container; and
wherein only the resilient material extends through a central opening in the bundle.

14. The system of claim 13, wherein the resilient material pulls the lower and upper removable inserts toward one another to apply a compressive force on the bundle.

15. The system of claim 13, wherein-the upper removable insert comprises a rod-shaped insert, and the resilient material comprises a resilient band coupled to central portions of the disc-shaped insert and the rod-shaped insert.

* * * * *